United States Patent
Hernández Callejas et al.

(10) Patent No.: US 6,509,053 B1
(45) Date of Patent: Jan. 21, 2003

(54) PROCESS FOR INDUSTRIAL PREPARATION OF VACUUM COOKED RICE

(75) Inventors: Antonio Hernández Callejas, San Juan de Aznalfarache (ES); Felix Hernández Callejas, San Juan de Aznalfarache (ES); Onofre Franco Balibrea, San Juan de Aznalfarache (ES)

(73) Assignee: Arrocerias Herba, S.A., Seville (ES)

( * ) Notice: Subject to any disclaimer, the term of this patent is extended or adjusted under 35 U.S.C. 154(b) by 0 days.

(21) Appl. No.: 09/869,572

(22) PCT Filed: Dec. 29, 1999

(86) PCT No.: PCT/ES99/00408
§ 371 (c)(1),
(2), (4) Date: Jun. 29, 2001

(87) PCT Pub. No.: WO00/40099
PCT Pub. Date: Jul. 13, 2000

(30) Foreign Application Priority Data

Jan. 8, 1999 (ES) ................................. 9900028

(51) Int. Cl.$^7$ ................................. A23L 1/00
(52) U.S. Cl. ................ 426/523; 426/438; 426/462
(58) Field of Search ................... 426/412, 438, 426/523, 462

(56) References Cited

U.S. PATENT DOCUMENTS

| | | | | |
|---|---|---|---|---|
| 4,986,995 A | * | 1/1991 | Kobayashi et al. | 426/412 |
| 5,130,153 A | * | 7/1992 | McIlroy et al. | 426/462 |
| 6,210,734 B1 | * | 4/2001 | Jun | 426/462 |

OTHER PUBLICATIONS

Derwent Abstract of JP 11056270 A, "Preparation of pouch packed rice food e.g. for pilaf or curried pilaf mixed rice—involves sterilizing mixture of fried rice and seasoning liquid that is simultaneously heated and cooked". Daiki Foods YG, Assignee. Publication Date, Mar. 2, 1999.

\* cited by examiner

*Primary Examiner*—George C. Yeung
(74) *Attorney, Agent, or Firm*—Nath & Associates PLLC; Gary M. Nath; Jerald L. Meyer

(57) ABSTRACT

The present application provides a novel process for the industrial preparation of rice cooked under vacuum, comprising the steps of cleaning, scalding, cooling, draining, drying, frying, mixing with sauces and/or solids, packaging, maceration, and cooking and sterilizing, as described and claimed herein.

4 Claims, 1 Drawing Sheet

PROCESS FOR INDUSTRIAL PREPARATION OF VACUUM COOKED RICE

Figure 1:
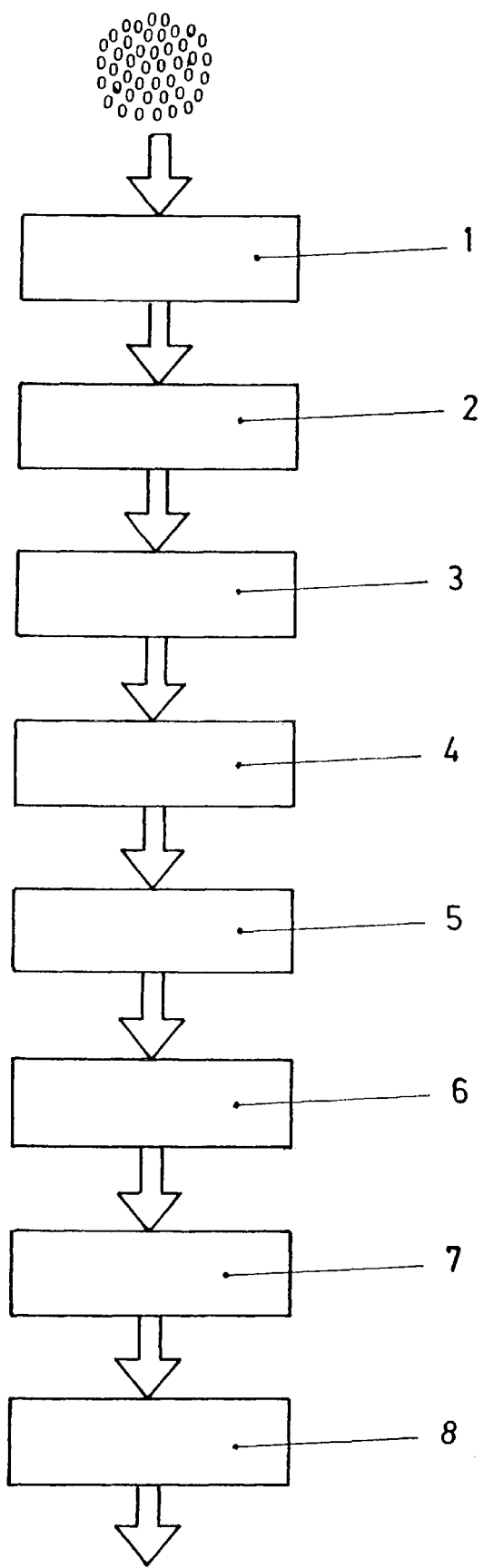

In the traditional preparation of rice at home, water is put in a recipient and heated till the boiling point is reached. At that moment the rice is incorporated, maintaining the water with the rice in boiling state for a time ranging from twenty-five to thirty minutes. Once elapsed the cooking time the rice is strained and cooked rice is obtained.

The cooking gelatinizes the rice starch and increases the transfer of soluble compounds towards its interior; so that if the rice is cooked in a liquid different from water, such as sauces or broths, it takes the flavour of that means, giving rise to tasteful cooked dishes.

Different processes have been developed trying to obtain rice cooked in an industrial way, maintaining it in this state for a certain time later on, until it is used by the user, but so far a really satisfactory solution has not been found for the preparation of rice cooked under vacuum with meat, shellfish and/or fish sauces, as it would be necessary in the case of the preparation of a traditional dish such as paella.

Indeed, under the up to now well-known solutions, we find different options which are subsequently summarized:

A.—THERMALLY TREATED RICE

Today the day, an industrial process is known in which the following ingredients take part: on the one hand rice, thermally treated and dehydrated previous to the process (i.e. vaporized rice) and on the other hand water. According to this process, the water is heated till a certain temperature and the previously treated and dehydrated rice is introduced for its rehydration and afterwards it is packed and thermally treated. This product has the main inconvenience that its texture is corklike and the rice grain does not absorb any flavour and, therefore, it is not advisable to use it in the preparation of culinary dishes which are more than simply rice cooked in water.

B.—RICE BLENDED WITH ACIDS AND OTHER AGENTS

Through the European Patent EP 0322996, a process is known in which the rice is maintained at a pH from five to seven, by mixing the rice with acids and neutralizing alkaline agents.

During the blending and packaging process, the product is maintained at about 82° C. (aseptically packed).

The main inconveniences of this process are the fact of the incorporation itself of neutralizing acids and alkaline agents to achieve the conservation, and on the other hand the short life of the product obtained this way, since the maximum expiration time does not surpass 9 months from the preparation date on.

C.—HYDRATED RICE

Industrial processes are already known that start from previous rice hydration; so that this hydrating is carried out by putting the rice to soak or by moistening it. When the hydration is carried out by soaking, the cooking is usually done in cameras with pressureless vapour or in some cases by indirect heating. When the hydration is carried out by moistening, the cooking is done in continuous or discontinuous autoclaves with vapour under pressure. With this previous hydration process, the industrial preparation of cooked rice is known, to be frozen or canned afterwards.

In the European Patent EP 0736260 a previous rice hydrating process is described, in which peeled rice is started from, which is put to soak in water at a temperature between twenty and seventy degrees centigrade, being later on cooked by means of vapour under pressure and finally the rice is dried and dehydrated for its sale.

Also, in the "CDTI Notebooks of Nourishment Technology—April 1993", industrial processes to prepare cooked rice are described, always with a previous rice hydrating phase, either by soaking the rice in water or by moistening.

JP-11056270 discloses a process for the preparation of rice in containers, wherein an hydration is produced and thus being the rice gelatinised.

These processes which require a previous rice hydration have the inconvenience that the rice grain is filled with water during the soaking or moistening phase, which hinders greatly the later entrance of sauces or broths, which are to give the rice a characteristic flavour, so that the rice cooked by means of industrial processes with previous rice hydrating are not appreciated in culinary uses, since they do not allow the dish to get the appropriate cooking flavour.

Saving this inconvenience, a solution is already known which allows the production of cooked rice in an industrial way and without previous hydration of the rice, as we will see subsequently.

D.—RICE NOT HYDRATED PREVIOUSLY

In the U.S. Pat. No. 4,986,995 a procedure for the production of cooked rice is described, starting from raw rice, without the need of its previous hydration.

According to this procedure, rice cooked in retort according to a process in which raw rice is introduced in a recipient with water and after having sealed this recipient the rice is cooked and at the same time sterilized raw inside the mentioned recipient.

This way, inside the mentioned recipient the gelatinization of the rice starch and the transfer of the soluble compounds to the interior takes place, so that if this cooking is done with sauces instead of with water, the flavour of these sauces penetrates inside the rice, improving this way its taste, as compared to the processes with previous hydration.

In the mentioned U.S. Pat. No. 4,986,995, it is indicated that in this process an inconvenience arises, residing in an unwished rice colouring. This colouring takes place as a result of a reaction of the oxygen with certain elements which are present in the rice or by decomposition of such elements. This phenomenon takes place when the rice is cooked at high temperatures (a hundred and twenty degrees centigrade and more), these temperatures are the ones employed in the industrial processes.

According to the aforementioned U.S. Pat. No. 4,986,995, a procedure is proposed by means of which cooked rice can be produced in retort without acquiring an unwished colour and without it losing any of the characteristics of its flavour. Therefore, the amount of oxygen inside the recipient that has to contain the rice is adjusted, using inert gas which when introduced in the recipient displaces the oxygen in the necessary amount so as to avoid that resulting unwished colouring. According to this procedure the amount of oxygen inside the recipient has to be from 4 to 12 ml per 100 gram of rice.

The mentioned procedure has in turn two main inconveniences, one of them the incorporation itself of inert gas inside the recipient with the rice to be cooked and on the other hand the fact that the recipient is not subjected to vacuum, since what is done is insuflating inert gas into the recipient to displace a certain amount of oxygen.

On the other hand, this procedure is valid for its use in the industrial preparation of rice cooked in water or even rice cooked in vegetable sauces and in similar products, but it is not valid for its use for rice cooked in meat, fish or shellfish sauces and, consequently such procedure would not be applicable for the preparation of rice for paella.

Indeed, according to the procedure described in U.S. Pat. No. 4,986,995, the conditions reached during the cooking are of about a hundred and twenty degrees centigrade for twenty minutes, which allows a Fo of between 5 and 6 to be reached. A Fo between 5 and 6 is acceptable for vegetables, but not for meat, fish, etc. . . What is more, even a Fo between 5 to 6 would not be admitted for tropical and similar countries.

With the procedure described in U.S. Pat. No. 4,986,995 it is not possible to reach a Fo value higher than 5 or 6, since when increasing the temperature and/or the cooking time, the rice does not resist it so and the final result is unacceptable rice.

According to the present invention, a process for the preparation of rice cooked in an industrial way is proposed, which discloses the following characteristics:

A previous hydration of the rice is not necessary.

There is no need to incorporate inert gas inside the recipient in which the rice is introduced for its cooking, so as to avoid its unwanted colouring.

A Fo between 8 and 16 is reached, which allows to lengthen the rice conservation time considerably once it is prepared and above all, it allows the preparation of rice cooked in meat, fish and/or shellfish sauces, even with the incorporation, next to the rice, of pieces of meat, fish, shellfish and vegetables, with a perfectly sterilized final product, as it has reached a Fo between 8 and 16.

In accordance with the process object of the present invention, :the rice is cleaned initially, eliminating its impurities by means of decanting the same through a current of cold water to a temperature, around 18° C., during no more than 15 seconds, which cleans the rice without moisturizing it.

In a following phase the rice is scalded in water between seventy and eighty degrees centigrade and preferably between seventy and seventy-five degrees centigrade (70°–75° C.), passing through a continuous belt during 1 to 6 minutes.

After the scalding it is cooled by means of cold water in a continuous belt, during no more than 10 seconds between 0° C. and 5° C., and subsequently the rice is dried by means of microfiltering air between 40° and 50° C., in continuous belt, being it fried later on; during this procedure the rice is sprayed with oil at high temperature, between 200° and 300° C. and preferably around two hundred and seventy-five degrees centigrade (275° C), during no more than 5 seconds, so that an external frying of the rice grains takes place, allowing to give these grains some appropriate conditions of resistance, looseness and swelling. The resistance acquired this way allows the rice to tolerate the necessary times and cooking temperatures to reach Fo values between eight and sixteen (8 and 16).

Once carried out the frying of the rice, a maceration phase follows, incorporating the sauces and solids in an aseptic atmosphere and leaving the whole to macerate, for the subsequent product packaging under vacuum and to go to a final sterilization phase in revolving autoclave.

This process brings about a series of advantages which are summarized in the following way:

With the scalding it is not necessary to use neutral gases, reaching the preparation of the grain to potentiate the final absorption of the flavours.

With the stabilizing with the help of microfiltered air the risk of contamination is eliminated, reaching a normalized working process that fulfils the most demanding hygienic-sanitary norms, so that the prepared culinary dishes are acceptable in any market, adding commercial value to the process.

With the frying at 275° C. the rice acquires a grain resistance for its cooking under vacuum and sterilization, reaching rice with a very nice texture and a longer conservation time, without any kind of damage to the grain for the absorption of the flavour humidity.

With the maceration it is possible to determine the flavours and the humidity that are wanted in each case so as to satisfy the consumers' likes.

With the cooking under vacuum and the quick cooling, a sterilization above 8 Fo is reached, allowing to lengthen the duration of the product between one and three years, without using additives, neither preservatives nor neutral gases.

With the sterilization in revolving autoclave and the cooling with the help of heat exchanger, temperatures can be used of up to a hundred and thirty-five degrees centigrade (135° C.), according to the recipients used for the rice packaging.

FIG. 1 represents a block diagram of the sequence of the process object of the invention.

The invention refers to a process for the preparation of rice cooked in an industrial way, being able to obtain the rice with any type of flavour that is wanted and with the possibility of its conservation for a long time, up to between one and three years.

The process consists in an operative sequence that begins with a rice decanting phase (1) by means of a shower with cold water to a temperature, around 18° C., during no more than 15 seconds, being carried out this operation on a belt conveyor, with filter, to recycle the water.

Once clean, the rice undergoes a scalding phase (2) which is carried out with water at a temperature of seventy degrees centigrade and preferably between seventy and seventy-five degrees centigrade in continuous belt during 1 to 6 minutes. With this operation it is avoided that the rice acquires an unwanted colouring, without the need to incorporate inert gases; as long as the mentioned scalding operation does not produce a previous rice hydration either.

Next a cooling phase (3) is carried out, which is done in continuous belt by means of a shower with refrigerated water between 0° and 5° C., during less than 10 seconds.

Then a drying phase (4) is carried out with the help of absolute filters, reaching microfiltered air between 40° and 50° which determines the stabilization and the drying of the rice, without any risk of contamination.

Subsequently a frying phase (5) is carried out, in which the rice is sprayed with oil at high temperature between 200° and 300° C. and preferably around two hundred and seventy-five degrees centigrade during no more than 5 seconds, with-which the frying of the external part of the rice grains is achieved, thanks to which these acquire a resistance which allows them to tolerate the necessary cooking time and temperatures to obtain Fo values between 8 (eight) and 16 (sixteen).

Next a dosage phase (6) is carried out, in which the rice is mixed with the sauces and solid ingredients, allowing the group to macerate.

Then a vacuum packaging phase (7) is carried out, allowing it again to macerate for a time between thirty and sixty minutes.

Lastly a cooking and sterilizing (8) phase is carried out in revolving autoclave, carrying out a sterilization higher than 8 Fo, with which a duration of the product is reached between one and three years, without the need to add preservatives nor to use cold atmosphere for the conservation.

The cooling is carried out in the revolving autoclave, incorporating a heat exchanger with which it is possible to cool it in a minimum time between five and fifteen minutes according to the kind of containers used.

Depending on the type of containers used, the treatment (8) in the autoclave is carried out with some variations of the temperature and of the Fo in the course of the time the operation lasts. Next some examples are indicated with the results obtained in both tests carried out with two different types of containers:

| With glass jars having a metallic cover | |
|---|---|
| Beginning: 15.5° C. | Fo = — |
| 05 minutes: 41.3° C. | Fo = — |
| 10 minutes: 79.6° C. | Fo = — |
| 15 minutes: 95.9° C. | Fo = 0.004 |
| 20 minutes: 107.8° C. | Fo = 0.092 |
| 25 minutes: 121.0° C. | Fo = 4.328 |
| 30 minutes: 125.0° C. | Fo = 8.750 |
| 35 minutes: 125.6° C. | Fo = 12.950 |
| 40 minutes: 119.6° C. | Fo = 14.500 |
| 45 minutes: 106.2° C. | Fo = 14.908 |
| 50 minutes: 80.4° C. | Fo = 14.969 |
| 55 minutes: 60.5° C. | Fo = 14.969 |
| 60 minutes: 25.2° C. | Fo = 14.969 |
| 65 minutes: 84° C. | Fo = 13.46 |
| 70 minutes: 72° C. | Fo = 13.46 |
| 75 minutes: 59° C. | Fo = 13.46 |
| 80 minutes: 42° C. | Fo = 13.46 |
| 85 minutes: 30° C. | Fo = 13.46 |
| With PP/EVOX/PP dish provided with aluminium cover | |
| Beginning: 17.5° C. | Fo = — |
| 05 minutes: 40.1° C. | Fo = — |
| 10 minutes: 75.9° C. | Fo = — |
| 15 minutes: 94.2° C. | Fo = 0.002 |
| 20 minutes: 105.2° C. | Fo = 0.081 |
| 25 minutes: 114.6° C. | Fo = 0.795 |
| 30 minutes: 119.8° C. | Fo = 3.935 |
| 35 minutes: 120.1° C. | Fo = 6.210 |
| 40 minutes: 120° C. | Fo = 9.321 |
| 45 minutes: 119.9° C. | Fo = 12.002 |
| 50 minutes: 109.1° C. | Fo = 12.841 |
| 55 minutes: 82.6° C. | Fo = 12.932 |
| 60 minutes: 40.9° C. | Fo = 12.932 |
| 65 minutes: 25.6° C. | Fo = 12.932 |
| 70 minutes: 72° C. | Fo = 12.46 |
| 75 minutes: 59° C. | Fo = 12.46 |
| 80 minutes: 42° C. | Fo = 12.46 |
| 85 minutes: 30° C. | Fo = 12.46 |

From these results, it can be seen that the sterilization degree begins from a temperature of about a hundred degrees centigrade (100° C.). On the other hand, at a certain moment the heating ceases and it begins to cool off but nevertheless the sterilization degree of the product continues to increase due to the internal temperature, until a sterilization point is reached, where it remains.

Here beyond some practical examples of the preparation of different quantities of rice are given, according to the process of the invention:

EXAMPLE 1

Decanting

Weight of rice: 225 gr

Scalding

Weight of rice: 225 gr
External humidity: 100%
Internal humidity: 1%
Temperature: 70° to 75° C.
Time: 1 to 7 minutes Cooling Weight of rice: 225 gr
External humidity: 100%
Internal humidity: 2%
Temperature: 5° to 10° C.
Time: 2 to 4 minutes Draining and Drying Weight of rice: 225 gr
External humidity: 0%
Internal humidity: 0%
Temperature: 15° to 18° C.
Time: 2 to 4 minutes Frying Weight of rice: 225 gr
Weight of oil: 18 gr
Temperature: 275° C.
Time: ½ to 2 minutes Dosing Weight of rice: 225 gr
Weight of oil: 18 gr
Pilaff sauce: 50 gr
Curry sauce: 50 gr
Negrésauce: 50 gr Mixing and Maceration Time: 2 to 4 minutes Vacuum Packaging and Second Maceration Time: 30 to 60 minutes Cooking and Sterilization in Rotary Autoclave According to the kind or recipients used (see previously exposed results of the tests).

EXAMPLE 2

Decanting

Weight of rice: 175 gr

Scalding

Weight of rice: 175 gr
External humidity: 100%
Internal humidity: 1%
Temperature: 70° to 75° C.
Time: 1 to 7 minutes Cooling Weight of rice: 175 gr
External humidity: 100%
Internal humidity: 2%
Temperature: 5° to 10° C.
Time: 2 to 4 minutes

Draining and Drying

Weight of rice: 175 gr
External humidity: 0%
Internal humidity: 0%
Temperature: 15° to 18° C.
Time: 2 to 4 minutes

Frying

Weight of rice: 175 gr
Weight of oil: 14 gr
Temperature: 275° C.
Time: ½ to 2 minutes

Dosing

Weight of rice: 175 gr
Weight of oil: 14 gr
Chicken sauce: 40 gr
Three delights sauce: 40 gr
Solid ingredients=variable quantities

Mixing and Maceration

Time: 2 to 4 minutes

Vacuum Packaging and Maceration

Time: 30 to 60 minutes

Cooking and Sterilization in Rotary Autoclave

According to the kind or recipients used (see previously exposed results of the tests).

EXAMPLE 3

Decanting

Weight of rice: 200 gr

Scalding

Weight of rice: 200 gr
External humidity: 100%
Internal humidity: 30–35%
Temperature: 70° to 75° C.
Time: 1 to 8 minutes

Cooling

Weight of rice: 200 gr
External humidity: 100%
Internal humidity: 35–45%
Temperature: 5° to 10° C.
Time: 2 to 4 minutes

Draining and Drying

Weight of rice: 200 gr
External humidity: 2%
Internal humidity: 35–45%
Temperature: 15° to 18° C.
Time: 2 to 4 minutes

Frying

Weight of rice: 200 gr
Weight of oil: 16 gr
Temperature: 275° C.
Time: ½ to 2 minutes

Dosing

Weight of rice: 270–290 gr
Weight of oil: 16 gr

Mixing and Maceration

Time: 2 to 4 minutes

Vacuum Packaging and Second Maceration

Time: 30 to 60 minutes

Cooking and Sterilization in Rotary Autoclave

According to the kind or recipients used (see previously exposed results of the tests).

It is verified that in the examples 1 and 2 the external and internal humidity of the grain is 0% in the DRAINING and DRYING, since in these cases with a SCALDING and COOLING it is only sought to prepare the rice grain so that later on it reaches the wanted texture and absorption when incorporating the corresponding sauces and solids.

In example 3, in which neither sauces nor solids are incorporated, if an external and internal humidity is determined in the grain, to get an incorporation of the rice into the stews which in one or two minutes absorb the flavours and the adequate degree of humidity and texture. In the same way it is nevertheless possible to elaborate other types of rice that acquire flavours, humidity and textures in other periods of time, for example between five and ten minutes, to be able to incorporate other types of ingredients, as in the case of paella.

Thanks to the FRYING and MACERATION the processed rice can resist very high temperatures and a processing time of eighty-five minutes or more, being able to achieve a very high sterilization degree (higher than 8 Fo=, with which a product of great quality is achieved which is excellent industrially and commercially, of which a great number of varieties can be obtained in combination with a multiplicity of different products.

What is claimed is:

1. A process for the industrial preparation of rice cooked under vacuum, comprising the steps of:
   initially cleaning rice and eliminating its dirt by decanting the rice through a shower of water at a temperature of about 18° C.,
   scalding cleaned the rice with hot water at a temperature between 60° and 80° C.,
   cooling the scalded rice with a shower of refrigerated water between 0° and 5° C.,
   draining and drying the cooled rice by means of microfiltered air at a temperature between 40° and 50° C.,
   frying the dried rice by spraying the rice with oil at a high temperature between 200° and 300° C.,
   mixing the fried rice with one or more sauces or solid ingredients to form a fried rice mixture, and
   after a maceration period, cooking and sterilizing the fried macerated mixture in a revolving autoclave under vacuum.

2. The process for the industrial preparation of rice cooked under vacuum, according to claim 1, wherein the rice scalding step is carried out with hot water between 70° and 75° C.

3. The process for the industrial preparation of rice cooked under vacuum, according to claim 1, wherein the rice frying step is carried out with oil at a temperature about 275° C.

4. The process for the industrial preparation of rice cooked under vacuum, according to claim 1, wherein the cooking and sterilizing steps are carried out with a progressive heating up to temperatures that reach 135° C., with subsequent cooling with a heat exchanger.

* * * * *